(12) United States Patent
Fujiwara et al.

(10) Patent No.: US 10,833,614 B2
(45) Date of Patent: Nov. 10, 2020

(54) MOTOR DRIVE DEVICE AND ELECTRIC POWER STEERING DEVICE

(71) Applicant: Nidec Corporation, Kyoto (JP)

(72) Inventors: Hiroki Fujiwara, Kyoto (JP); Yoshihisa Kanno, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 16/469,660

(22) PCT Filed: Dec. 28, 2017

(86) PCT No.: PCT/JP2017/047188
§ 371 (c)(1),
(2) Date: Jun. 14, 2019

(87) PCT Pub. No.: WO2018/142828
PCT Pub. Date: Aug. 9, 2018

(65) Prior Publication Data
US 2019/0312536 A1   Oct. 10, 2019

(30) Foreign Application Priority Data

Jan. 31, 2017   (JP) .................. 2017-016161

(51) Int. Cl.
*H02P 6/28* (2016.01)
*H02P 6/14* (2016.01)
(Continued)

(52) U.S. Cl.
CPC ............... *H02P 6/28* (2016.02); *B62D 5/046* (2013.01); *H02M 1/08* (2013.01); *H02M 7/48* (2013.01);
(Continued)

(58) Field of Classification Search
None
See application file for complete search history.

(56) References Cited

U.S. PATENT DOCUMENTS

| 5,453,709 A * | 9/1995 | Tanimoto | H03K 5/133 |
| | | | 327/276 |
| 2007/0285381 A1 * | 12/2007 | Gong | G09G 3/3406 |
| | | | 345/102 |

(Continued)

FOREIGN PATENT DOCUMENTS

| JP | 2006-021645 A | 1/2006 |
| JP | 2009-220705 A | 10/2009 |
| JP | 2015-033270 A | 2/2015 |

OTHER PUBLICATIONS

Official Communication issued in International Patent Application No. PCT/JP2017/047188, dated Apr. 3, 2018.

*Primary Examiner* — Bentsu Ro
(74) *Attorney, Agent, or Firm* — Keating & Bennett

(57) ABSTRACT

A motor drive device includes an inverter circuit, a first switching circuit to switch a path between a power supply and the inverter circuit to conduction and interruption, a second switching circuit to switch a path between the inverter circuit and the motor, a current detector to detect a current of the inverter circuit, a controller to, in a case in which a current value of the detected current is not within a predetermined range, output a command voltage which commands switching from the conduction to the interruption, a driver to boost the command voltage input from the controller and output the boosted command voltage to each switching circuit, and a delay circuit disposed between the second switching circuit and the driver to set a timing at which the command voltage is input to the second switching circuit to be later than a timing at which the command voltage is input to the first switching circuit.

11 Claims, 6 Drawing Sheets

(51) Int. Cl.
*B62D 5/04* (2006.01)
*H02M 1/08* (2006.01)
*H02M 7/5387* (2007.01)
*H02M 7/48* (2007.01)
*H02P 27/06* (2006.01)
*H02P 6/00* (2016.01)
*H02M 1/00* (2006.01)

(52) U.S. Cl.
CPC .......... *H02M 7/53871* (2013.01); *H02P 6/00* (2013.01); *H02P 6/14* (2013.01); *H02P 27/06* (2013.01); *H02M 2001/0009* (2013.01)

(56) References Cited

U.S. PATENT DOCUMENTS

| | | | |
|---|---|---|---|
| 2009/0045764 A1* | 2/2009 | Hoogzaad | G11B 19/20 318/503 |
| 2011/0273122 A1 | 11/2011 | Murata et al. | |
| 2012/0286712 A1 | 11/2012 | Tsuboi et al. | |
| 2013/0176056 A1* | 7/2013 | Kim | H03K 3/011 327/2 |
| 2017/0077695 A1* | 3/2017 | Li | H02H 7/1203 |
| 2017/0297616 A1 | 10/2017 | Kikuchi et al. | |

* cited by examiner

MOTOR DRIVE DEVICE AND ELECTRIC POWER STEERING DEVICE

CROSS REFERENCE TO RELATED APPLICATIONS

This is the U.S. national stage of application No. PCT/JP2017/047188, filed on Dec. 28, 2017, and priority under 35 U.S.C. § 119(a) and 35 U.S.C. § 365(b) is claimed from Japanese Application No. 2017-016161, filed Jan. 31, 2017; the entire contents of which are incorporated herein by reference.

1. FIELD OF THE INVENTION

The present disclosure relates to a motor drive device and an electric power steering device.

2. BACKGROUND

As a motor drive device for driving a motor used in an electric power steering device and the like, a motor drive device including a switching circuit configured to switch a current supply path between an inverter circuit and a power supply and between the inverter circuit and a motor to a conducting state and an interrupted state is known. In a case in which a current value of current flowing through the inverter circuit exceeds a predetermined range, an electric power steering device stops assisting a steering wheel operation. After the assistance stops, when a connection between the inverter circuit and the motor is maintained, manual operation of the steering wheel causes the motor to function as a generator, causing unnecessary load on the steering wheel operation. Also, when a connection between the inverter circuit and the power supply is maintained, malfunction of the electric power steering device may occur.

In a case in which the inverter circuit fails, the switching circuit interrupts the connection between the power supply and the inverter circuit and the connection between the motor and the inverter circuit. Here, when the connection between the motor and the inverter circuit is interrupted before the connection between the power supply and the inverter circuit is interrupted, counter electromotive force from the motor is applied to a switching element included in the switching circuit between the motor and the inverter circuit. Due to the counter electromotive force, a voltage applied to the switching element may exceed a maximum rating of the switching element and cause damage thereto.

Conventionally, a related art discloses a motor drive device that directly sends a command signal, which interrupts a connection between a motor and an inverter circuit, to a switching element after power supply to the inverter circuit is stopped.

SUMMARY

However, in the motor drive device of the related art, depending on a response speed of the switching element, it may be difficult to switch the connection according to the command signal.

A first example embodiment of the present disclosure is a motor drive device for driving a motor, the motor drive device including an inverter circuit to supply a current supplied from an external power supply to the motor, a first switching circuit to switch a current supply path between the external power supply and the inverter circuit to a conducting state and an interrupted state, a second switching circuit to switch a current supply path between the inverter circuit and the motor to a conducting state and an interrupted state, a current detector to detect a current flowing through the inverter circuit, a controller to, in a case in which a current value of the detected current is not within a predetermined range, output an interruption command voltage which commands switching from the conducting state to the interrupted state, and a switching driver to boost the interruption command voltage input from the controller to output the boosted interruption command voltage to the first switching circuit and the second switching circuit, wherein a delay circuit is disposed between the second switching circuit and the switching driver to set a timing at which the boosted interruption command voltage is input to the second switching circuit to be later than a timing at which the boosted interruption command voltage is input to the first switching circuit.

The above and other elements, features, steps, characteristics and advantages of the present disclosure will become more apparent from the following detailed description of the example embodiments with reference to the attached drawings.

DETAILED DESCRIPTION

Hereinafter, example embodiments for carrying out the present disclosure will be described with reference to the accompanying drawings and the like. Further, the scope of the present disclosure is not limited to the example embodiments below and may be arbitrarily changed within the scope of the technical idea of the present disclosure.

Figure 1:
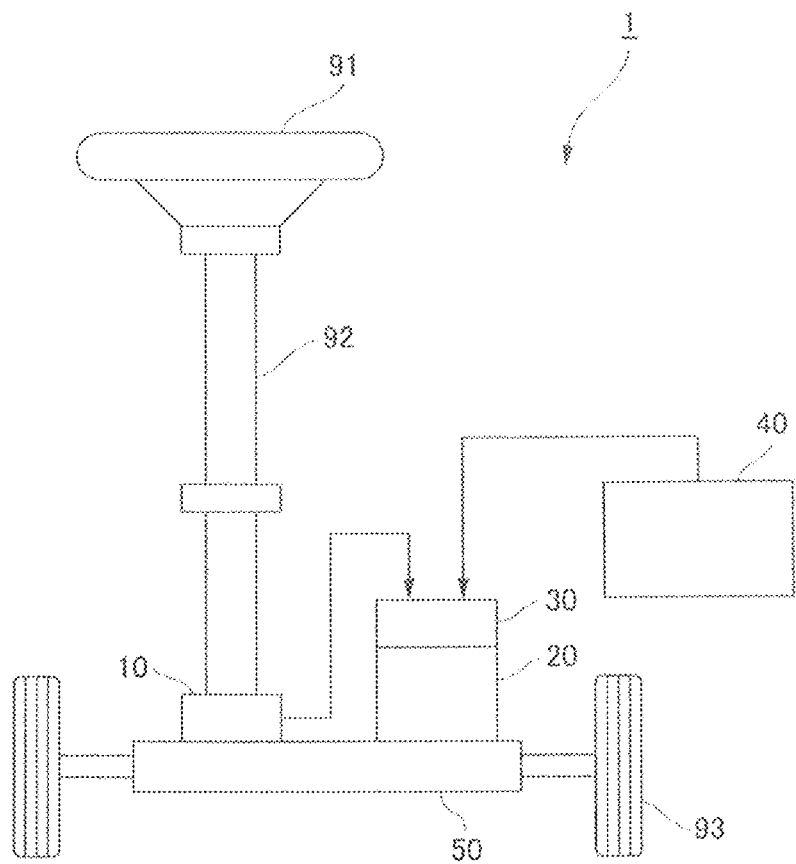
FIG. 1 is a schematic diagram of an electric power steering device including a motor drive device.

FIG. 1 is a schematic diagram of an electric power steering device 1 including a motor drive device 30 according to the present example embodiment. The electric power steering device 1 is a device for assisting a driver's steering wheel operation in transportation equipment such as an automobile. As illustrated in FIG. 1, the electric power steering device 1 of the present example embodiment includes a torque sensor 10, a motor 20, and a motor drive device 30. In the present example embodiment, the motor 20 and the motor drive device 30 are incorporated in a common housing. By the motor 20 being a so-called "mechanically- and electrically-integrated type," for example, the size of the electric power steering device 1 can be reduced.

The torque sensor 10 is attached to a steering shaft 92. When a driver operates a steering wheel 91 and causes the steering shaft 92 to rotate, the torque sensor 10 detects torque applied to the steering shaft 92. A torque signal, which is a detection signal of the torque sensor 10, is output from the torque sensor 10 to the motor drive device 30. The motor drive device 30 causes the motor 20 to be driven on the basis of the torque signal input from the torque sensor 10. Further, the motor drive device 30 may also refer to other information (for example, a vehicle speed or the like) in addition to the torque signal.

The motor drive device 30 uses power obtained from an external power supply 40 to supply a drive current to the motor 20. A drive force generated from the motor 20 is transmitted to a vehicle wheel 93 via a gearbox 50. Consequently, a steering angle of the vehicle wheel 93 is changed. In this manner, the electric power steering device 1 amplifies torque of the steering shaft 92 by the motor 20 and causes the steering angle of the vehicle wheel 93 to change. Accordingly, the driver can operate the steering wheel 91 with light force.

Figure 2:
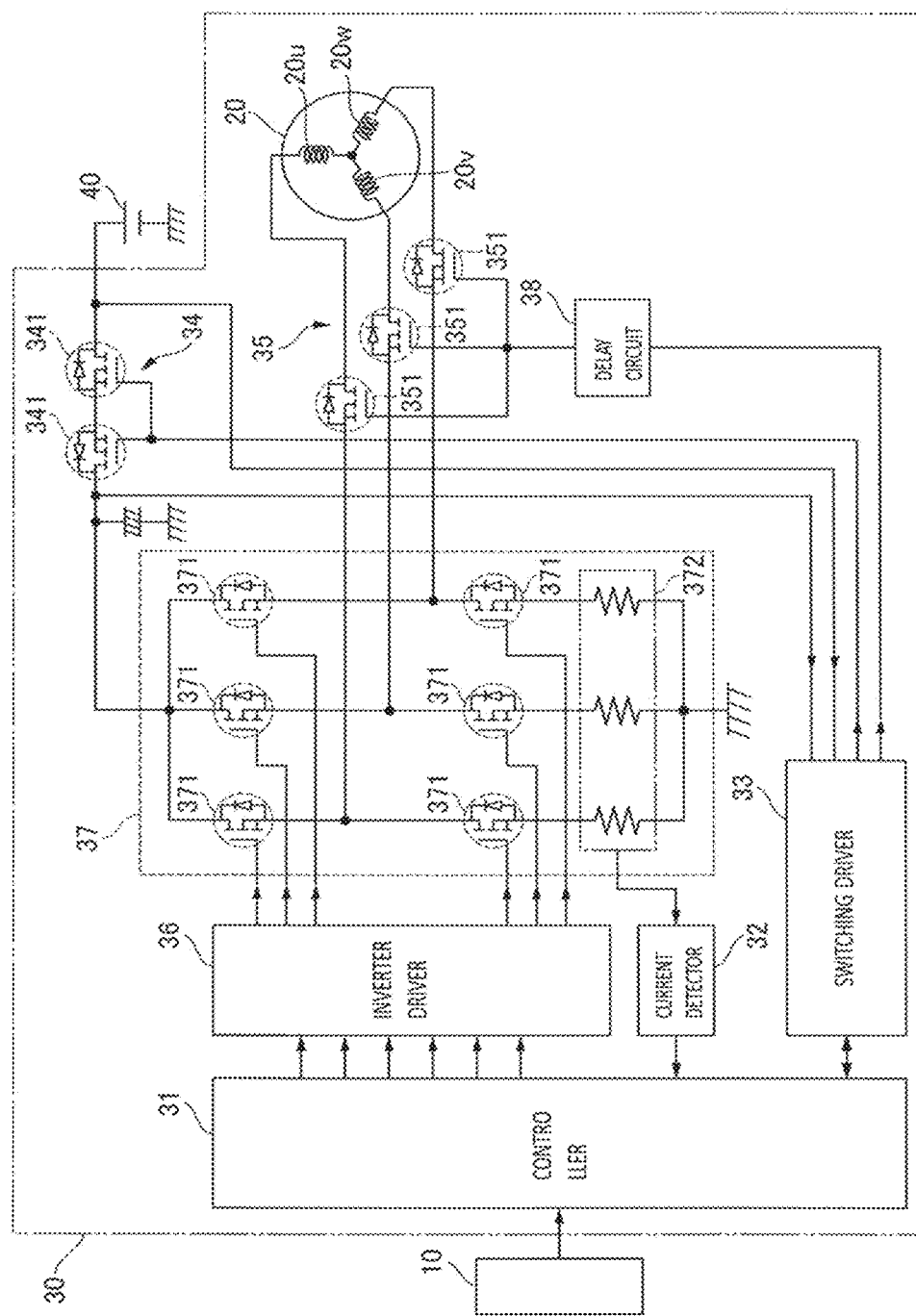
FIG. 2 is a block diagram illustrating a configuration of the motor drive device.

A configuration of the motor drive device 30 will be described. FIG. 2 is a block diagram illustrating a configuration of the motor drive device 30. As illustrated in FIG. 2, the motor drive device 30 includes a controller 31, a current detector 32, a switching driver 33, a first switching circuit 34, a second switching circuit 35, an inverter driver 36, an inverter circuit 37, and a delay circuit 38.

In the present example embodiment, a three-phase synchronous brushless motor is used as the motor 20. The motor 20 is configured of coils of three phases including a U-phase 20u, a V-phase 20v, and a W-phase 20w. While the motor 20 is driven, current is supplied from the motor drive device 30 to each of the U-phase 20u, the V-phase 20v, and the W-phase in the motor 20. When the current is supplied, a rotational magnetic field occurs between a stator including the coils of the three-phases including the U-phase 20u, the V-phase 20v, and the W-phase 20w and a rotor including a magnet. As a result, the rotor rotates with respect to the stator of the motor 20.

The controller 31 receives a torque signal output from the torque sensor 10. As the controller 31, for example, a computer is used which includes an arithmetic processor such as a central processing unit (CPU), a memory such as a random access memory (RAM), and a storage unit such as a hard disk drive. However, instead of the computer, an electric circuit including an arithmetic unit such as a microcontroller may also be used.

Figure 3:
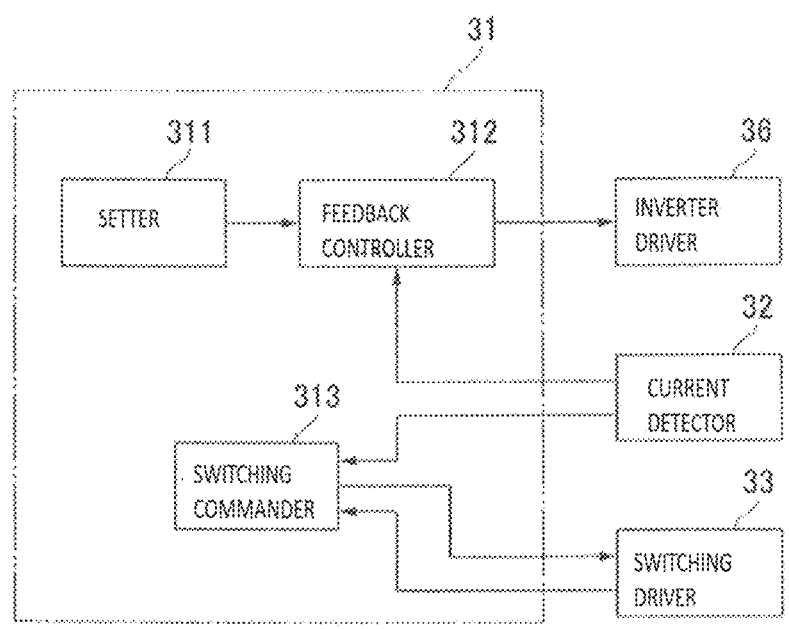
FIG. 3 is a block diagram illustrating each function of a controller.

FIG. 3 is a block diagram illustrating each function of the controller 31. The controller 31 includes a setter 311, a feedback controller 312, and a switching commander 313. The setter 311 sets a drive signal for driving the motor 20 on the basis of the torque signal from the torque sensor 10.

The feedback controller 312 generates a drive signal at which a current value of current flowing through the inverter circuit 37 that is detected by the current detector 32 becomes close to a current value corresponding to the drive signal set by the setter 311. For example, in the present example embodiment, the generated drive signal is a pulse width modulation (PWM) drive signal using a PWM method and includes duty ratio information. The feedback controller 312 outputs the PWM drive signal to the inverter driver 36.

The current value of current flowing through the inverter circuit 37 that is detected by the current detector 32 and a result of monitoring, by the switching driver 33, whether overcurrent flowing through the first switching circuit 34 is present are input to the switching commander 313. Also, a signal indicating that the switching driver 33 has commanded interruption of connection to the first switching circuit 34 and a signal indicating that the switching driver 33 has commanded conduction of a current supply path to the first switching circuit 34 are also input from the switching driver 33 to the switching commander 313. A current value of current flowing through the first switching circuit 34 indicates whether a failure is present in the inverter circuit 37.

In a case in which the current value of current flowing through the inverter circuit 37 is not within a predetermined range, the switching commander 313 outputs, to the switching driver 33, an interruption command voltage which commands interruption of connection to the first switching circuit 34 and the second switching circuit 35.

In a case in which the current value of current flowing through the inverter circuit 37 is within the predetermined range, the switching commander 313 outputs, to the switching driver 33, a conduction command voltage which causes a current supply path to be in a conducting state to the first switching circuit 34 and the second switching circuit 35.

The predetermined range is a range of the current value of current flowing through the inverter circuit 37 in a state in which a short circuit or an open circuit does not occur in the inverter circuit 37. The interruption of connection refers to switching a current supply path between the external power supply 40 and the inverter circuit 37 (hereinafter referred to as "power supply line") from a conducting state to an interrupted state and switching a current supply path between the inverter circuit 37 and the motor 20 from the conducting state to the interrupted state. Each of the above-described functions can be realized on the basis of a program pre-stored in a memory in the controller 31.

Referring back to FIG. 2, the current detector 32 is an electric circuit for detecting a current flowing through shunt resistors 372 included in the inverter circuit 37. The current detector 32 measures a potential difference between both ends of three shunt resistors 372, thereby generating a detection signal indicating current flowing through each shunt resistor 372. The generated detection signal is sent from the current detector 32 to the feedback controller 312 and the switching commander 313 of the controller 31 illustrated in FIG. 3.

The switching driver 33 is an electric circuit having a function of boosting and outputting an input voltage, a function of monitoring whether overcurrent flowing through the power supply line is present and outputting a monitoring result, and a function of outputting the conduction command voltage or the interruption command voltage on the basis of the monitoring result. In a case in which the conduction command voltage is input, the switching driver 33 boosts the conduction command voltage to a voltage at which a field-effect transistor (FET) included in the first switching circuit 34 and the second switching circuit 35 can be turned on and outputs the boosted conduction command voltage to each switching circuit. Turning on the FET refers to causing current to flow between a source and a drain of the FET. Also, turning off the FET refers to causing current to not flow between a source and a drain of the FET. Further, in a case in which the interruption command voltage is input, the switching driver 33 boosts the interruption command voltage as necessary so that a potential difference between a gate and a source of an FET is 0 V and outputs the boosted interruption command voltage.

The switching driver 33 monitors a potential difference between drains of two FETs included in the first switching circuit 34, thereby monitoring overcurrent flowing through the power supply line. In a case in which, with the potential difference of a voltage between drains when the overcurrent flows through the power line as a threshold value, the voltage between drains exceeds the threshold value, the switching driver 33 determines that the overcurrent is detected. In a case in which the voltage between drains is lower than or equal to the threshold value, the switching driver 33 determines that the overcurrent is not flowing through the power line.

In the case in which the switching driver 33 determines that the overcurrent is detected, the switching driver 33 outputs a signal indicating that the overcurrent is detected to the switching commander 313. Furthermore, the switching driver 33 outputs, to the switching commander 313, an interruption command voltage which commands interruption of connection to the first switching circuit and a signal indicating that the interruption is commanded.

In the case in which the switching driver 33 determines that the overcurrent is not flowing through the power line, the switching driver 33 outputs a signal, which indicates that the overcurrent is not flowing through the power line, to the switching commander 313. Furthermore, the switching driver 33 outputs, to the switching commander 313, a conduction command voltage which commands conduction of connection to the first switching circuit 34 and a signal indicating that the conduction is commanded.

The current value of current flowing through the power line is affected by whether a failure is present in the inverter circuit 37. By monitoring whether the overcurrent flowing through the power line is present, the switching driver 33 can monitor a state of the inverter circuit 37. Therefore, because the state of the inverter circuit 37 can be double-monitored by the current detector 32 and the switching driver 33, it is possible to further improve safety of the motor drive device 30.

The first switching circuit 34 is an electric circuit configured to switch the current supply path between the external power supply 40 and the inverter circuit 37 to a conducting state and an interrupted state. The first switching circuit 34 includes a pair of FETs 341 connected in series with each other's sources in order from the external power supply 40. According to this connection method, it is possible to prevent a failure in the first switching circuit 34 due to switching of current supply to the inverter circuit 37.

The second switching circuit 35 is an electric circuit configured to switch the current supply path between the inverter circuit 37 and the motor 20 to a conducting state and an interrupted state. The second switching circuit 35 includes as many FETs 351 as the number of phases of the motor 20. Also, each drain of the FETs 351 is connected to each phase of the motor 20. According to this connection method, in a case in which a failure occurs in the inverter circuit 37 due to a short circuit or an open circuit, the inverter circuit 37 can be interrupted from each phase of the motor 20 to avoid locking of the motor 20 due to the failure in the inverter circuit 37.

The inverter driver 36 is an electric circuit for causing the inverter circuit 37 to operate. In the present example embodiment, the inverter driver 36 supplies the PWM drive signal output by the feedback controller 312 illustrated in FIG. 3 to six switching elements 371 included in the inverter circuit 37.

The inverter circuit 37 is an electric circuit configured to supply the current supplied from the external power supply 40 to the motor 20. As the six switching elements 371 included in the inverter circuit 37, for example, transistors such as FETs are used. In the present example embodiment, three sets of a pair of switching elements 371 connected in series between the external power supply 40 and the ground are provided in parallel. In the present example embodiment, metal-oxide semiconductor field-effect transistors (MOS-FETs) are used as the FETs 341 and 351 and the switching elements 371.

The delay circuit 38 is an electric circuit configured to delay a timing at which an input signal is output. A time taken for a signal input to the delay circuit 38 to be output from the delay circuit 38 is referred to as delay time. In the present example embodiment, the delay time is in the order of milliseconds. The delay circuit 38 is disposed between the second switching circuit 35 and the switching driver 33. The switching driver 33 outputs the interruption command voltage to the first switching circuit 34 and the second switching circuit 35. The delay circuit 38 sets a timing at which the interruption command voltage is input to the second switching circuit 35 to be later than a timing at which the interruption command voltage is input to the first switching circuit 34.

By disposing the delay circuit 38 as described above, in the case in which the inverter circuit 37 has failed, it is possible to improve certainty of control, in which connection between the motor 20 and the inverter circuit 37 is interrupted, after interrupting connection between the external power supply 40 and the inverter circuit 37. Also, for example, an influence of a difference in response speeds of the FETs 341 and FETs 351 on the delay control can be reduced. Accordingly, it is possible to prevent a case in which a counter electromotive force from the motor 20 exceeds a maximum rating of the FETs 351 and causes damage to the FETs 351.

In the present example embodiment, the interruption command voltage output from the delay circuit 38 is collectively input to gates of the FETs 351. By collectively performing the delay control for each phase of the motor 20, it is possible to improve certainty of control in which a timing at which the boosted interruption command voltage is input to the second switching circuit 35 is set to be later than a timing at which the boosted interruption command voltage is input to the first switching circuit 34. Accordingly, when the inverter circuit 37 has failed, it is possible to interrupt connection between the motor 20 and the inverter circuit 37 after interruption of the connection between the external power supply 40 and the inverter circuit 37. Then, it is possible to prevent a case in which a counter electromotive force from the motor 20 exceeds the maximum rating of the FETs 351 and causes damage to the FETs 351.

Figure 4A:
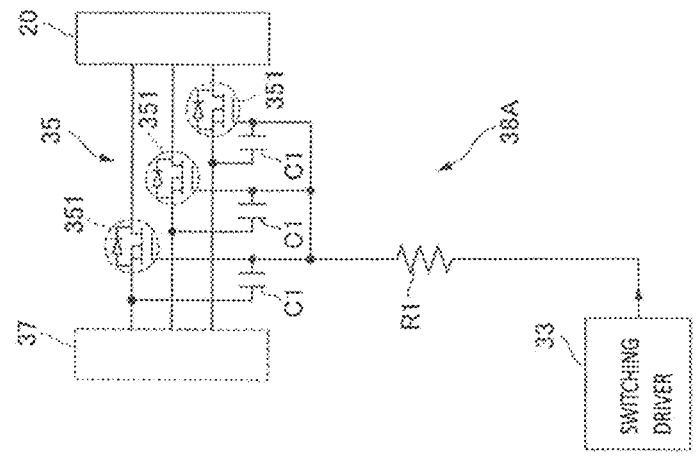
FIG. 4A, FIG. 4B, and FIG. 4C are views illustrating configuration examples of a delay circuit.
Figure 4B:
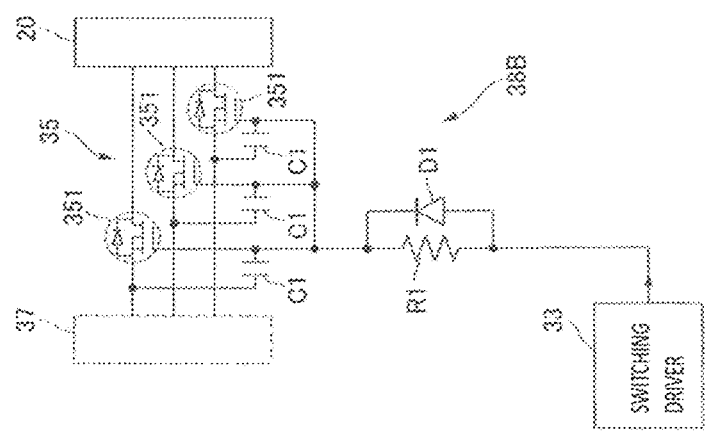
Figure 4C:
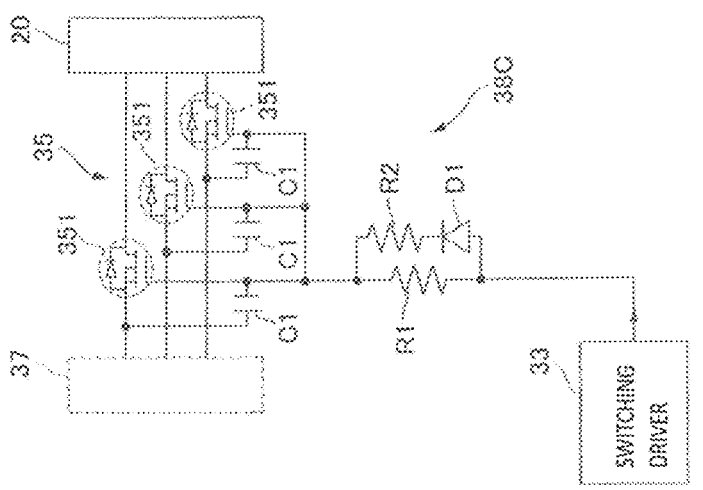

FIGS. 4A, 4B, and 4C are views illustrating configuration examples of the delay circuit 38. A delay circuit 38A illustrated in FIG. 4A includes a single resistor R1 and as many capacitors C1 as the number of FETs 351. The resistor R1 is connected in series to one end of each capacitor C1. A connection point between the resistor R1 and the one end of each capacitor C1 is connected to gates of the FETs 351, and the other end of each capacitor C1 is connected to sources of the FETs 351. The delay time is determined by a resistance value of the resistor R1 and a capacitance value of the capacitor C1. It is possible to prevent a failure in the second switching circuit 35 by the delay time by which the timing at which the interruption command voltage is input to the second switching circuit 35 is set to be later than the timing at which the interruption command voltage is input to the first switching circuit 34.

A delay circuit 38B illustrated in FIG. 4B is a circuit in which a diode D1 is added to the delay circuit 38A. The diode D1 is connected in parallel to the resistor R1. The diode D1 is a forward diode directed toward the capacitor C1 from the switching driver 33. By disposing the diode D1 in this manner, from among the conduction command voltage and the interruption command voltage, it is possible to cause a timing at which the interruption command voltage is input to the second switching circuit 35 to be later than a timing at which the interruption command voltage is input to the first switching circuit 34. Consequently, it is possible to prevent a failure in the second switching circuit 35.

A delay circuit 38C illustrated in FIG. 4C is a circuit in which a resistor R2 is added to the delay circuit 38B. The resistor R2 is disposed in parallel with the resistor R1 between the diode D1 and the capacitor C1. By disposing the resistor R2 in this manner, it is possible to cause the timing at which the conduction command voltage and the interruption command voltage are input to the second switching circuit 35 to be later than a timing at which the conduction command voltage and the interruption command voltage are input to the first switching circuit 34. Consequently, it is possible to prevent a failure in the second switching circuit 35.

In the above-described example embodiment, the interruption command voltage output from the delay circuit 38 is collectively input to the gates of the FETs 351. In the present modified example, the interruption command voltage and the conduction command voltage are separately input for each of the U-phase 20u, the V-phase 20v, and the W-phase 20w of the motor 20. By performing the delay control separately for each phase, it is possible to identify a location of failure or to perform an operation using only non-faulty phases.

Figure 5A:
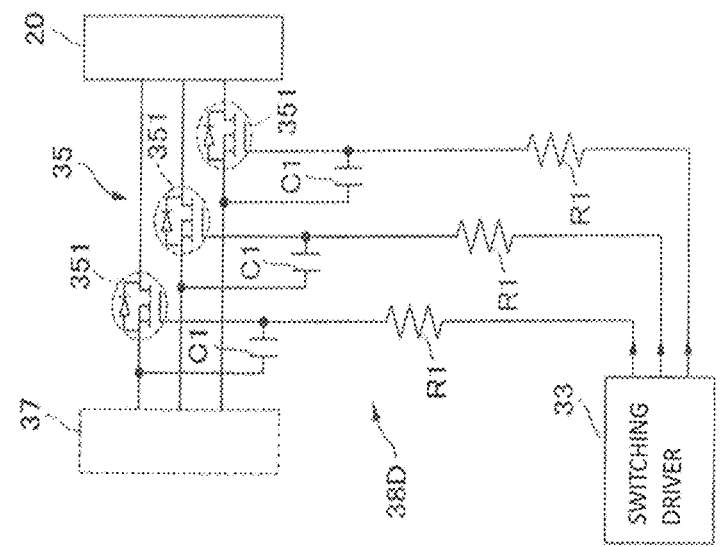
FIG. 5A, FIG. 5B, and FIG. 5C are views illustrating configuration examples of the delay circuit.
Figure 5B:
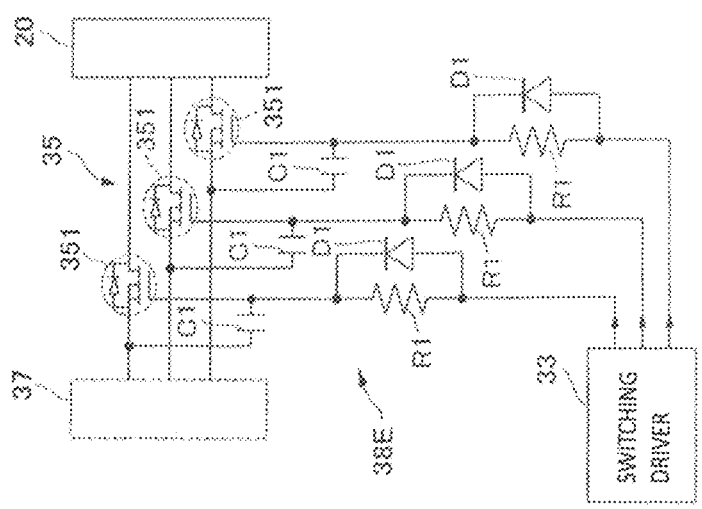
Figure 5C:
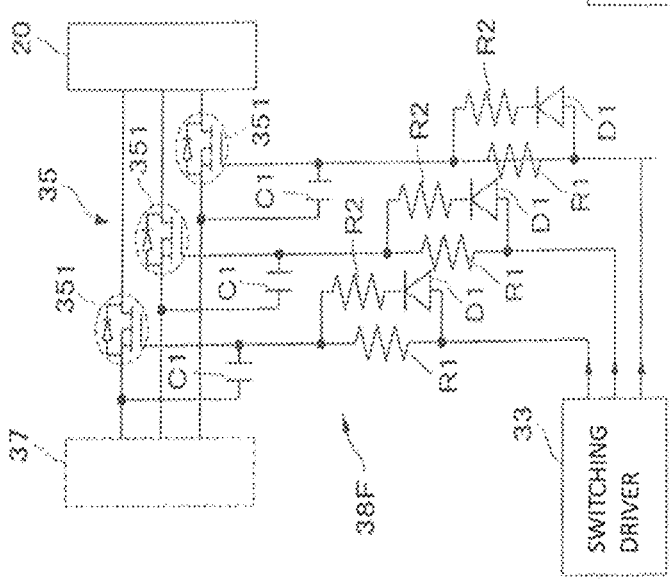

FIGS. 5A, 5B, and 5C are views illustrating configuration examples of the delay circuit 38. A delay circuit 38D illustrated in FIG. 5A includes as many resistors R1 as the number of FETs 351 and as many capacitors C1 as the number of FETs 351. Each resistor R1 is connected in series to one end of each capacitor C1. Connection points between the resistors R1 and the one ends of the capacitors C1 are connected to gates of the FETs 351, and the other ends of the capacitors C1 are connected to sources of the FETs 351. The delay time is determined by a resistance value of the resistor R1 and a capacitance value of the capacitor C1. It is possible to prevent a failure in the second switching circuit 35 by the delay time by which the timing at which the interruption command voltage is input to the second switching circuit 35 is set to be later than the timing at which the interruption command voltage is input to the first switching circuit 34.

A delay circuit 38E illustrated in FIG. 5B is a circuit in which diodes D1 are added to the delay circuit 38D. Each diode D1 is connected in parallel to each resistor R1. The diode D1 is a forward diode directed toward the capacitor C1 from the switching driver 33. By disposing the diode D1 in this manner, from among the conduction command voltage and the interruption command voltage, it is possible to cause a timing at which the interruption command voltage is input to the second switching circuit 35 to be later than a timing at which the interruption command voltage is input to the first switching circuit 34. Consequently, it is possible to prevent a failure in the second switching circuit 35.

A delay circuit 38F illustrated in FIG. 5C is a circuit in which resistors R2 are added to the delay circuit 38E. The resistor R2 is disposed in parallel with the resistor R1 between the diode D1 and the capacitor C1. By disposing the resistor R2 in this manner, it is possible to cause the timing at which the conduction command voltage and the interruption command voltage are input to the second switching circuit 35 to be later than a timing at which the conduction command voltage and the interruption command voltage are input to the first switching circuit 34. Consequently, it is possible to prevent a failure in the second switching circuit 35.

As described above, according to the present example embodiment and the present modified example, there is provided a motor drive device which is advantageous in terms of certainty of control in which a timing at which a connection between a motor and an inverter circuit is interrupted is caused to be later than a timing at which a connection between a power supply and the inverter circuit is interrupted. Also, in an electric power steering device that is particularly required to have safety, the demand for safety can be met by providing the motor drive device according to the present example embodiment and the present modified example.

Figure 6:
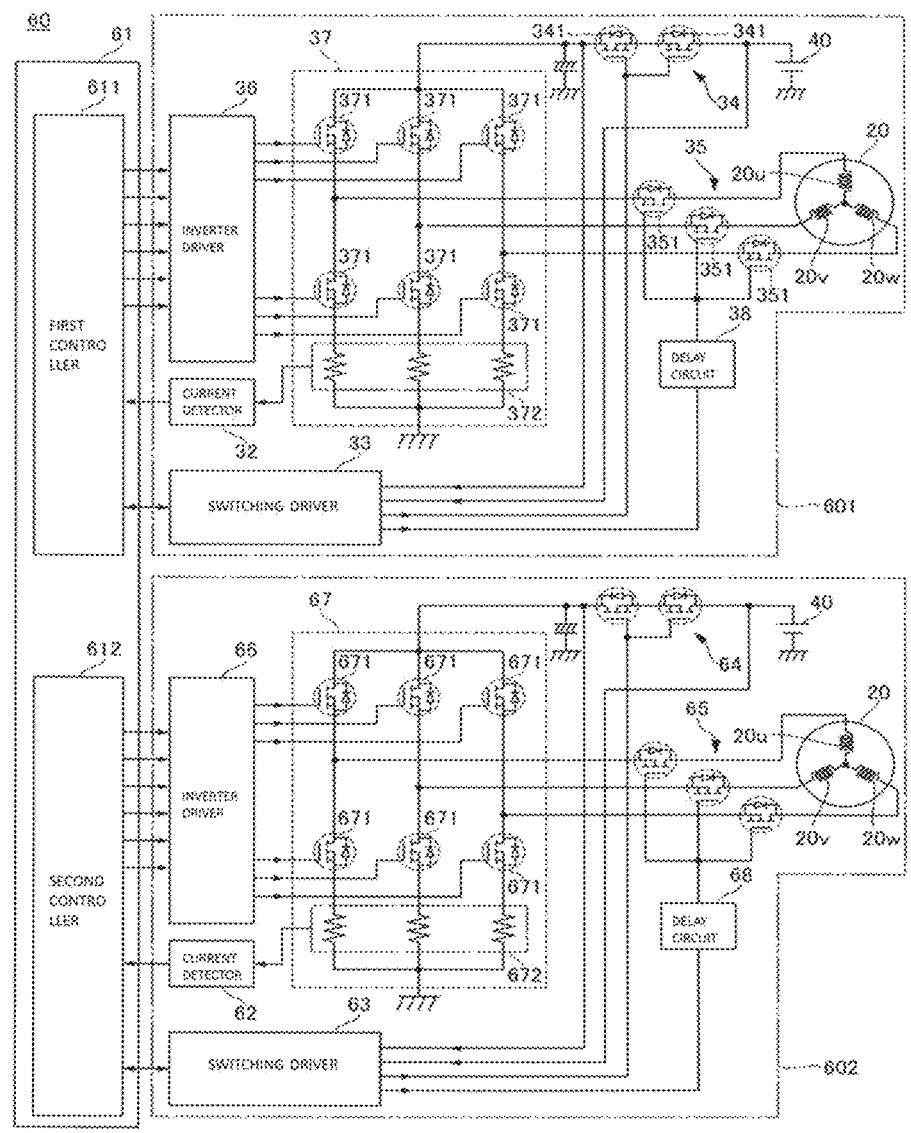
FIG. 6 is a block diagram illustrating a configuration of a motor drive device in a case in which two motors are controlled.

Although the case in which the controller 31 controls a single motor has been described above in relation to the example embodiment and the modified example, the number of motors controlled is not limited to one. For example, two motors may be controlled. FIG. 6 is a block diagram illustrating a configuration of a motor drive device in a case in which two motors are controlled. In this case, the electric power steering device 1 includes two motors 20.

A combination between the motor 20 and the current detector 32, the switching driver 33, the first switching circuit 34, the second switching circuit 35, the inverter driver 36, the inverter circuit 37, and the delay circuit 38 illustrated in FIG. 2 is assumed as a first system 601. In addition to the first system 601, a motor drive device 60 of FIG. 6 includes a second system 602 having the same combination as the system 601. That is, the second system 602 includes a current detector 62, a switching driver 63, a first switching circuit 64, a second switching circuit 65, an inverter driver 66, an inverter circuit 67, a delay circuit 68, and a motor 20.

The motor drive device 60 includes a controller 61 including a first controller 611 and a second controller 612. The first controller 611 performs control of the first system 601, and the second controller 612 performs control of the second system 602. In a case in which one of the first system 601 and the second system 602 fails, it is possible to continue operation of the electric power steering device 1 using the other system. By using the motor drive device including the two systems, it is possible to improve safety of the electric power steering device. Further, in the case in which the motor drive device including a plurality of systems is used, it is necessary to design each system so as not to affect each other.

Further, the motor 20 is not limited to having three phases. Also, the motor drive device 30 or 60 may be applied to devices other than the electric power steering device. For example, the motor drive device 30 or 60 may cause a motor used in other portions of transportation equipment, such as an automobile, to be driven. Also, the motor drive device 30 or 60 may cause a motor mounted in equipment other than an automobile, such as an industrial robot, to be driven.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor drive device for driving a motor, the motor drive device comprising:
    an inverter circuit to supply a current supplied from an external power supply to the motor;

a first switching circuit to switch a current supply path between the external power supply and the inverter circuit to a conducting state and an interrupted state;

a second switching circuit to switch a current supply path between the inverter circuit and the motor to a conducting state and an interrupted state;

a current detector to detect a current flowing through the inverter circuit;

a controller to, in a case in which a current value of the detected current is not within a predetermined range, output an interruption command voltage that commands switching from the conducting state to the interrupted state; and a switching driver to boost the interruption command voltage input from the controller to output the boosted interruption command voltage to the first switching circuit and the second switching circuit; wherein a delay circuit is disposed between the second switching circuit and the switching driver to set a timing at which the boosted interruption command voltage is input to the second switching circuit to be later than a timing at which the boosted interruption command voltage is input to the first switching circuit.

2. The motor driver according to claim 1, wherein
the motor includes a plurality of phases;
the second switching circuit includes a number of field-effect transistors (FETs) equal to a number of the plurality of phases of the motor; and
a drain of each of the FETs is connected to each of the plurality of phases of the motor.

3. The motor drive device according to claim 2, wherein the delay circuit collectively outputs a boosted interruption command voltage to a gate of each of the FETs.

4. The motor drive device according to claim 3, wherein
the delay circuit includes a single resistor and a number of capacitors equal to the number of the FETs;
the resistor is connected in series to a first end of each of the capacitors;
a connection point between the resistor and the first end of each of the capacitors is connected to a gate of each of the FETs; and
a second end of each of the capacitors is connected to a source of each of the FETs.

5. The motor drive device according to claim 4, wherein a forward diode directed toward the plurality of capacitors from the switching driver is connected in parallel to the resistor.

6. The motor drive device according to claim 2, wherein the delay circuit separately outputs the boosted interruption command voltage to a gate of each of the FETs.

7. The motor drive device according to claim 6, wherein
the delay circuit includes a number of resistors equal to the number of FETs and a number of capacitors equal to the number of the FETs;
each of the resistors is connected in series to a first end of each of the capacitors;
a connection point between each of the resistors and the first end of each of the capacitors is connected to a gate of each of the FETs; and
a second end of each of the capacitors is connected to a source of each of the FETs.

8. The motor drive device according to claim 7, wherein a forward diode directed toward the capacitors from the switching driver is connected in parallel to each of the resistors.

9. The motor drive device according to claim 1, wherein the first switching circuit includes a pair of Field Effect Transistors (FETs) connected in series with each other's sources in order from the external power supply.

10. The motor drive device according to claim 9, wherein, in a case in which a potential difference between drains of the pair of FETs exceeds a predetermined threshold value, the switching driver outputs an interruption command voltage which commands switching of a current supply path from a conducting state to an interrupted state.

11. An electric power steering device comprising a motor driven by the motor drive device according to claim 1.

* * * * *